United States Patent Office 2,958,649
Patented Nov. 1, 1960

2,958,649
CATALYTIC REFORMING OF HYDROCARBONS

Peter Thomas White and Ernest Carlton Housam, Sunbury-on-Thames, England, assignors to The British Petroleum Company Limited, London, England, a British joint-stock corporation No Drawing. Filed Mar. 11, 1958, Ser. No. 720,536
Claims priority, application Great Britain Mar. 20, 1957

6 Claims. (Cl. 208—136)

This invention relates to the dehydrogenation or dehydrocyclization of non-aromatic hydrocarbons.

The dehydrogenation and dehydrocyclization of non-aromatic hydrocarbons are endothermic reactions and it is well known that the supply of heat to such reactions presents problems. Depending on the severity of operation, the endothermic heat of reaction may range from 50 B.t.u./lb. of feed to as much as 600 B.t.u./lb. of feed. In practice it is usual to pre-heat the feedstock, or the catalyst, or the recycle gases if used, to above the reaction temperature, but the degree of superheat is limited by the danger of thermal degradation of the feed or catalyst and by the desirability of maintaining, as far as possible, an even temperature throughout the reaction zone.

According to the present invention, a method of supplying heat to an endothermic process for the dehydrogenation or dehydrocyclization of a feedstock consisting of or containing non-aromatic hydrocarbons, comprises contacting the feedstock at an elevated temperature of from 800 to 1300° F. in a reaction zone with a fluidized or moving bed of catalyst containing also a metal oxide having no appreciable catalytic activity for the reaction which is reduced with evolution of heat under the reaction conditions, continuously or intermittently withdrawing catalyst containing reduced metal oxide from the reaction zone, treating the catalyst with an amount of oxygen in excess of that required to regenerate the catalyst by burning off the carbonaceous deposits so that reduced metal oxide is re-oxidized, and returning the catalyst containing re-oxidized metal oxide to the reaction zone.

The metal oxide may be an integral part of the catalyst itself or may be in the form of particles admixed with the catalyst. As mentioned above, it should have no appreciable catalytic activity for the reaction, serving principally to provide heat by exothermic reduction during the reaction. It may, however, have some promoting effect on the catalyst. An example of a suitable metal oxide is cupric oxide. Other preferable constituents of the catalyst are a supporting material, such as alumina, and a minor proportion of one or more promoters, for example a compound, preferably an oxide, of one of the following elements—a rare earth or mixture of rare earths, bismuth, boron or germanium, with or without an alkali metal, preferably potassium. Yet another effective promoter is a minor proportion of a spinel such as cobalt chromite, copper chromite, zinc titanate, or iron chromite either as such or in the form of the naturally occurring ore chrome ironstone.

A particularly preferred catalyst comprises chromium oxide supported on alumina, to which has been added a minor proportion of copper oxide, either as a constituent of the catalyst itself or as particles admixed with the catalyst. The catalyst may also contain a minor proportion of an alkali metal oxide, for example potassium oxide, and a minor proportion of a rare earth oxide, for example cerium oxide or a mixture of rare earth oxides.

During regeneration as it is normally practiced commercially, the amount of oxygen supplied to the regeneration is kept to the minimum necessary to burn off carbonaceous deposits. Since these carbonaceous deposits are preferentially oxidized before any oxidizable catalyst constituents, an excess of oxygen is required, beyond that necessary to burn off the carbonaceous deposits, to re-oxidize the reduced metal oxide. This excess of oxygen is preferably supplied during the regeneration step by increasing the oxygen content of the regeneration gas and/or by increasing the residence time of the catalyst in the regeneration zone. If desired, however, the catalyst can be treated with oxygen to re-oxidize reduced metal oxide as a separate step subsequent to regeneration.

The amount of reducible metal oxide in or admixed with the catalyst will depend on its heat of reduction, the degree of reduction achieved under the reaction conditions and the heat deficiency of the endothermic process. In general 5–25% of metal oxide by weight of total catalyst is preferred.

With complete reduction of cupric oxide by carbon and hydrogen in the ratio of five to one by weight, the heat liberated is 12.2 K cal./mol or 280 B.t.u./lb. of cupric oxide. Thus, assuming an efficiency in practice of 85% for the reduction and re-oxidation and a catalyst/feed ratio of 8:1, 173 B.t.u./lb. of feed will be supplied if 10% of cupric oxide by weight of catalyst forms part of or is admixed with the catalyst.

Heat will also be liberated if the cupric oxide is reduced only as far as cuprous oxide, and the term "reduced metal oxide" as used in this specification is not limited to any particular chemical form and includes both elemental metals and oxides in which the metal has a valency below its highest possible valency.

The present invention is applicable to dehydrogenation or dehydrocyclization reactions generally, but is particularly suitable for the up-grading of hydrocarbon fractions boiling in the gasoline or naphtha range to give products of increased aromatic content, suitable for example as gasoline blending components of high octane number at a pressure of not more than 50 p.s.i.g. (including atmospheric pressure or below) and without recycle of the hydrogen-containing gas produced or addition of extraneous hydrogen. The feedstocks for such reactions may be catalytic reformates or portions thereof, for example the lower-boiling relatively aromatic-free fractions of reformates, or straight-run gasoline fractions, for example light gasoline. The temperature should be from 840–1075° F., particularly in the vicinity of 975° F., and the space velocity from 0.1 to 1.0 v./v./hr.

The following examples illustrate the use of copper oxide as a heat transfer material.

EXAMPLE 1

A debutanized light fraction of a reformate obtained by processing a naphtha fraction over a catalyst consisting of platinum, alumina and combined halogen having an end boiling point of 112° C. and a research octane number (clear) of 72.9 was processed using a fixed bed of catalyst under the following conditions:

Temperature _____ 530° C.
Pressure _____ Atmospheric.
Space velocity _____ 0.2 v./v./hr.
Recycle gas _____ None.
Process period _____ 5 hours.

Two runs were carried out—in the first the catalyst was 10% chromia on alumina promoted with 1% cerium oxide and 1% potassium oxide, in the second the same catalyst was used admixed with 10% by weight of catalyst of cupric oxide particles. The mixture of catalyst and oxide in the second run had been subjected to a conventional regeneration but had not been treated with hydrogen prior to the processing.

The results are set out in Table 1 below.

*Table 1*

| Catalyst | Debutanized Product | | Exit Gas | |
|---|---|---|---|---|
| | ON (Res.) Clear | Yield | Gas Make, s.c.f./b. | H₂ content, percent vol. |
| (A) 10% Cr₂O₃/Al₂O₃+1% Ce₂O₃ +1% K₂O | 100.3 | 63 | 1,850 | 76 |
| (A)+10% CuO (Regenerated, not reduced) | 100.5 | 70 | 1,880 | 75 |

The results indicate that the presence of cupric oxide does not affect the main reaction of dehydrogenation and/or dehydrocyclization, and in fact improves it slightly. At the same time, assuming complete efficiency for the cupric oxide reduction, the cupric oxide supplied 280 B.t.u./lb. of oxide or 25.5 B.t.u./lb. of catalyst. In a fluidized bed process under similar conditions at a catalyst/oil ratio of 8:1 and assuming 85% efficiency for the reduction of the cupric oxide, this would be equivalent to 173 B.t.u./lb. of feed. At a catalyst specific heat of 0.24, the catalyst inlet temperature would have to be 90° F. above the reaction temperature to supply an equivalent amount of heat, if no cupric oxide were present.

EXAMPLE 2

Example 1 was repeated except that a catalyst was used which consisted of 10% chromia on alumina promoted with 1% cerium oxide and 1% potassium oxide and containing also 5% of cupric oxide as an actual catalyst constituent. The results obtained were generally similar to those of Example 1 as shown below.

*Table 2*

| Catalyst | Debutanized Product | | Exit Gas | |
|---|---|---|---|---|
| | ON (Res.) Clear | Yield | Gas Make, s.c.f./b. | H₂ content, percent vol. |
| 10% chromia on alumina with 1% Ce₂O₃, 1% K₂O and 5% CuO | 101.1 | 66 | 1,670 | 73 |

EXAMPLE 3

150 g. of a mixture of the catalyst of Example 1 and cupric oxide, the latter forming 13.5 g. of the mixture, was treated under various conditions of regeneration in a stream of oxygen-containing gas and of reduction in a stream of hydrogen to determine the reversibility of the cupric oxide reduction-oxidation process and the rate of reduction and re-oxidation. Complete reduction of 13.5 g. of cupric oxide to copper and oxidation of hydrogen to water gives 2.85 g. water and the results obtained were measured against this theoretical value.

On reducing the fresh mixture of catalyst and cupric oxide in a stream of hydrogen it was found that the water formed was 3.87 g. i.e., 1.02 in excess of theoretical. This indicated that some of the catalyst itself was reduced also, but after one cycle of regeneration for 15 hr. at 450° C. in a stream of oxygen-containing gas followed by reduction for 15 hrs. at 450° C. using a flow of 8 litres of hydrogen per hour, the water formed was 3.15 g., i.e., 0.30 g. in excess of theoretical. This amount of 0.30 g. was thus taken as the amount of water formed in practice on reduction of the catalyst itself Two further runs were carried out—in the first 1 hr. periods of regeneration and reduction were used, in the second the mixture was regenerated for a relatively long period to ensure maximum re-oxidation, then used to treat light platformate for ½ hour under the process conditions of Example 1, and finally reduced for a relatively long period to determine the amount of unreduced cupric oxide left after the ½ hour processing period.

The results are set out in Table 3 below.

*Table 3*

| Catalyst Pretreatment | Reduction | | | Water formed (g.) |
|---|---|---|---|---|
| | Period (hr.) | H₂ rate (l./hr.) | Temp. (° C.) | |
| Theoretical | | | | 2.85 |
| By reduction of catalyst itself | | | | 0.30 |
| 1. Regenerated (500° C., 1 hr.) | 1 | 30 | 450 | 2.63 |
| 2. Regenerated (540° C., 10 hr.), run with light platformate for ½ hr. at 530° C. | 18 | 8 | 450 | 0.34 |

The results indicate that:

(i) One hour periods of regeneration and reduction at 500° C. and 450° C. respectively, give a yield of 2.63 g. of water, which is a substantial proportion of the theoretical even allowing for the possible formation of up to 0.30 g. of water by reduction of the catalyst itself.

(ii) Assuming complete re-oxidation of the cupric oxide when regenerated at 540° C. max. for 10 hrs., at least 88% of the cupric oxide was reduced during a ½ hr. run under the processing conditions of Example 1. This follows from the fact that only 0.34 g. of water was formed under prolonged reducing conditions carried out subsequently to the processing step.

We claim:

1. A process for supplying heat to an endothermic dehydrogenation or dehydrocyclization reaction of a petroleum feedstock containing non-aromatic hydrocarbons to effect an increase of the olefinic or aromatic content therein, said feedstock boiling in the range selected from the group consisting of the gasoline range and the naphtha range, comprising contacting the feedstock at a temperature of about 800 to 1300° F. with a fluidized catalyst bed of chromium oxide on alumina, said catalyst containing from 5 to 25% by weight of total catalyst of copper oxide, said copper oxide having no appreciable catalytic activity for the reaction, said copper oxide being reduced under the reaction conditions with heat being evolved by the reduction thereof, withdrawing the catalyst containing the reduced copper oxide from the reaction zone, treating the withdrawn catalyst and the reduced copper oxide with an amount of oxygen in excess of that normally required to regenerate the catalyst to effect a burning off of the carbonaceous deposits and the re-oxidation of the reduced copper oxide, returning the regenerated catalyst and the re-oxidized copper oxide to the reaction zone and recovering treated feedstock of increased olefin or aromatic content as a product thereof.

2. A method as claimed in claim 1, wherein the metal oxide is an integral part of the catalyst.

3. A method as claimed in claim 1, wherein the metal oxide is in the form of particles admixed with the catalyst.

4. A method as claimed in claim 1, wherein the endothermic process is carried out at a pressure of not more than 50 p.s.i.g. a temperature of 840 to 1075° F., a space velocity of 0.1 to 1.0 v./v./hr. and without any addition of hydrogen to the reaction zone.

5. A method as claimed in claim 4, wherein the feedstock is selected from the class consisting of catalytic reformates and portions thereof.

6. A method as claimed in claim 4, wherein the feedstock is a straight-run gasoline fraction.

References Cited in the file of this patent

UNITED STATES PATENTS

| | | |
|---|---|---|
| Re. 24,484 | Belchetz et al. | June 10, 1958 |
| 2,244,612 | Crawley | June 3, 1941 |
| 2,410,891 | Meinert et al. | Nov. 12, 1946 |
| 2,436,927 | Kassel | Mar. 2, 1948 |
| 2,498,709 | Roberts et al. | Feb. 28, 1950 |
| 2,765,222 | Martin et al. | Oct. 2, 1956 |